United States Patent [19]
Ishikawa

[11] Patent Number: 5,936,753
[45] Date of Patent: Aug. 10, 1999

[54] OPTICAL NETWORK SYSTEM

[75] Inventor: Tomohisa Ishikawa, Kawasaki, Japan

[73] Assignee: Fujitsu Limited, Kawasaki, Japan

[21] Appl. No.: 08/874,667

[22] Filed: Jun. 13, 1997

[30]     Foreign Application Priority Data

Nov. 19, 1996  [JP]  Japan ................................. 8-307804

[51] Int. Cl.⁶ ........................... H04J 14/02; H04B 10/08
[52] U.S. Cl. ........................ 359/125; 359/121; 359/134; 359/167; 359/110
[58] Field of Search ................... 359/110, 187, 359/120–121, 125, 137, 167, 173, 134; 385/140

[56]           References Cited

U.S. PATENT DOCUMENTS 5,202,780  4/1993  Fussganger ........................... 359/125
5,469,283  11/1995  Vinel et al. ............................ 359/121
5,812,295   9/1998  Kitasagami ............................ 359/167

Primary Examiner—Kinfe-Michael Negash
Attorney, Agent, or Firm—Staas & Halsey

[57]                 ABSTRACT

An optical network system for bidirectional transmission between a main system (e.g., central station) and a plurality of auxiliary systems (e.g., subscriber's stations). The main system outputs a main optical signal to a main fiber. The auxiliary systems output auxiliary optical signals to a plurality of auxiliary fibers, respectively. The main fiber and the auxiliary fibers are network-connected by a connecting unit. The main system has a detector for detecting the auxiliary optical signals and a control signal generator for generating a control signal including data for designating a specific auxiliary system whose auxiliary optical signal is not detected. The main optical signal in the auxiliary fiber corresponding to the specific auxiliary system is attenuated according to the control signal. Accordingly, laser hazard in each auxiliary system is prevented.

18 Claims, 15 Drawing Sheets

NORMAL CONDITION

LINE BROKEN CONDITION

LINE RECOVERED CONDITION

NORMAL CONDITION

LINE BROKEN CONDITION

LINE RECOVERED CONDITION

F I G.15
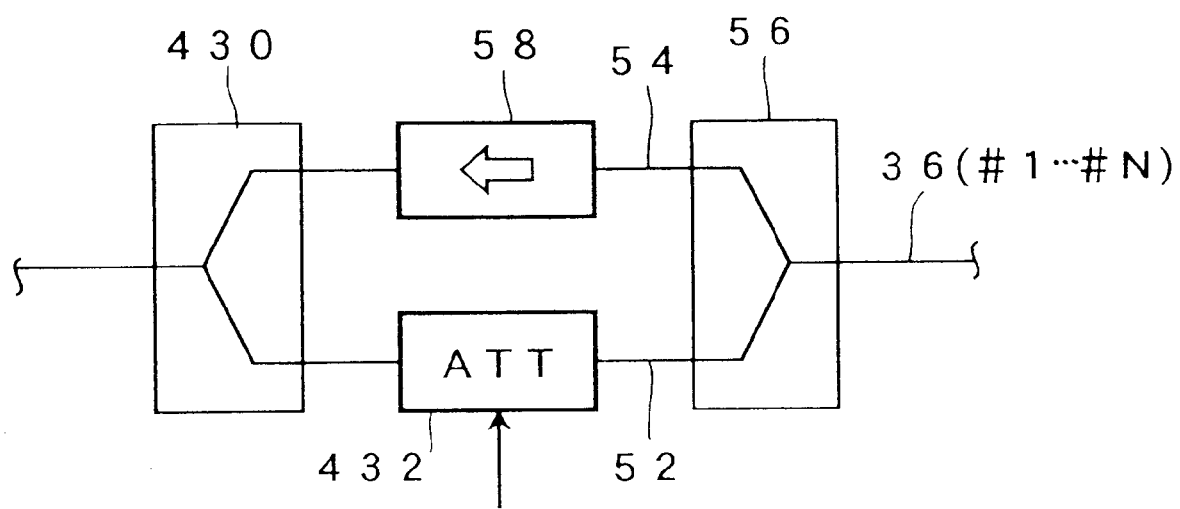

OPTICAL NETWORK SYSTEM

BACKGROUND OF THE INVENTION

1. Field of the Invention

The present invention relates generally to an optical network system configured by connecting a plurality of systems through an optical fiber network, and more particularly to an optical network system for bidirectional transmission between a main system (e.g., central station) and a plurality of auxiliary systems (e.g., subscriber's stations).

2. Description of the Related Art

An example of a conventional optical network system will now be described with reference to FIG. 1. This conventional system includes a main system 100 for outputting a main optical signal to a main fiber 26, a plurality of auxiliary systems 200 (#1 to #N) respectively connected to a plurality of auxiliary fibers 36 (#1 to #N), for outputting auxiliary optical signals to the auxiliary fibers 36 (#1 to #N), respectively, and a branching unit 300 for network-connecting the main fiber 26 and the auxiliary fibers 36 (#1 to #N).

In the case of providing the service of VOD (Video On Demand) by this optical network system, the main system 100 is a central station connected to a provider of a video signal, and each of the auxiliary systems 200 (#1 to #N) is a subscriber's station.

Assuming that a plurality of main fibers are present as the main fiber 26, a star configuration is provided with respect to the main system 100. Further, as the plural auxiliary fibers 36 (#1 to #N) are connected to the branching unit 300, a star configuration is provided also with respect to the branching unit 300. In this case, the optical network system is called a double star. Particularly in the case that the branching unit 300 includes only passive components such as an optical star coupler, the above optical network system is called a passive double star (PDS). The detail of this conventional system will be hereinafter described in contrast with the present invention.

In recent years, an optical amplifier such as an EDFA (erbium doped fiber amplifier) has been developed. In the above optical network system, for example, the main optical signal can be distributed to the plural auxiliary optical fibers 36 by amplifying the main optical signal. When such a high-power optical signal is supplied to the branching unit 300, the optical power in each auxiliary fiber 36 also becomes high, causing a possibility of laser hazard. For example, if any of the auxiliary fibers 36 is broken, it is required to cope with laser hazard, so as to repair a break point in this broken auxiliary fiber. Further, when an optical connector connected to any of the auxiliary fibers 36, there is a possibility that a high-power optical signal is radiated to a general user from the connector end. Therefore, it is also required to cope with this radiation.

SUMMARY OF THE INVENTION

It is therefore an object of the present invention to provide an optical network system which can prevent laser hazard.

In accordance with the present invention, there is provided an optical network system comprising a main system connected to a main fiber, a plurality of auxiliary systems respectively connected to a plurality of auxiliary fibers, and means for connecting the main fiber and the auxiliary fibers. The main system outputs a main optical signal to the main fiber. The auxiliary systems output auxiliary optical signals to the auxiliary fibers, respectively. The main system has means for detecting the auxiliary optical signals and means for generating a control signal for designating the auxiliary system whose auxiliary optical signal is not detected, according to the detection by the detecting means. The main optical signal in the auxiliary fiber corresponding to the auxiliary system whose auxiliary optical signal is not detected is attenuated according to the control signal.

In the optical network system of the present invention, the main optical signal in any of the auxiliary fibers is attenuated if this auxiliary fiber is broken or an optical connector connected to this auxiliary fiber is disconnected. Accordingly, laser hazard is prevented.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 15 is a block diagram showing a preferred embodiment using an optical attenuator.

DETAILED DESCRIPTION OF THE PREFERRED EMBODIMENTS

Figure 1:
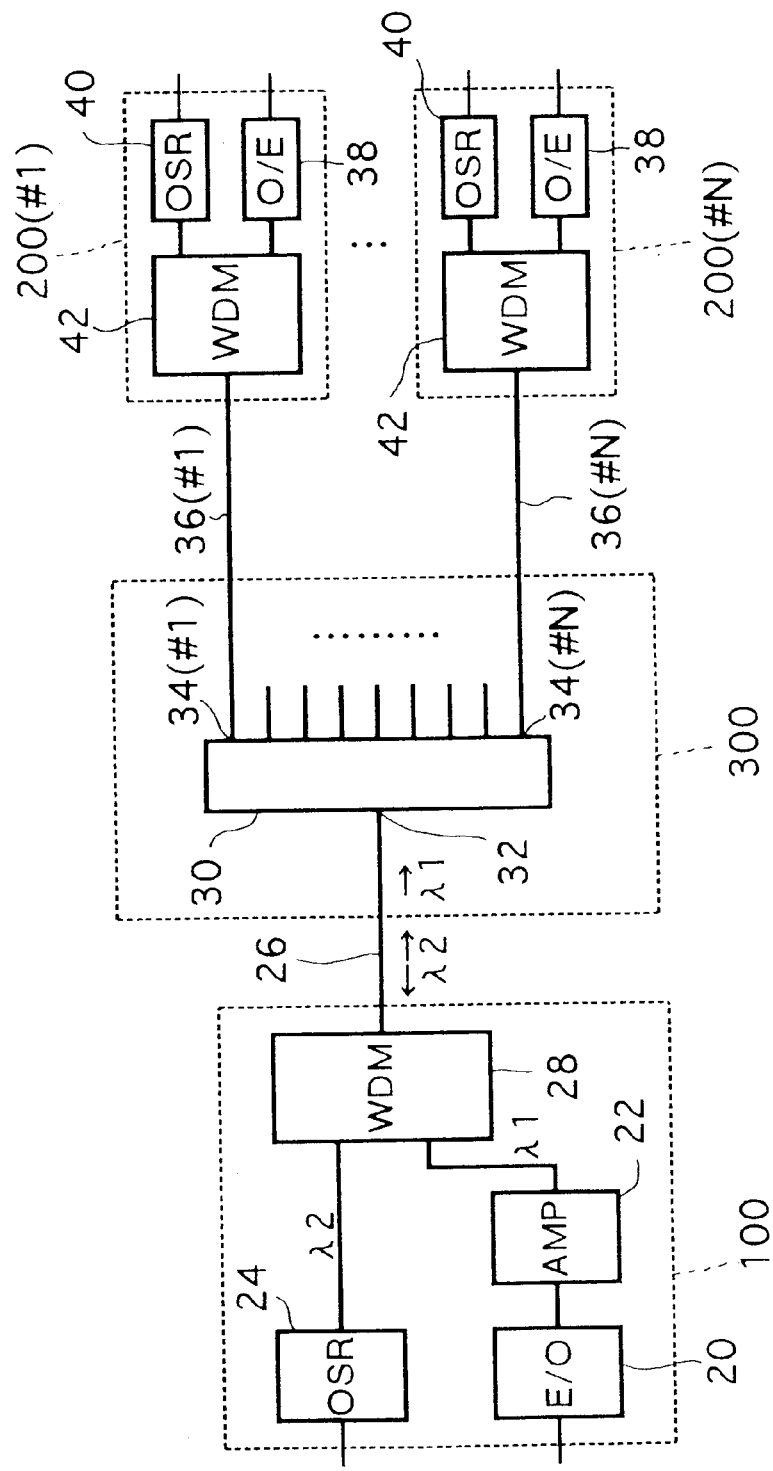
FIG. 1 is a block diagram of an optical network system (prior art)

Some preferred embodiments of the present invention will now be described in detail with reference to the attached drawings. Throughout the drawings, substantially the same parts are denoted by the same reference numerals.

Figure 2:
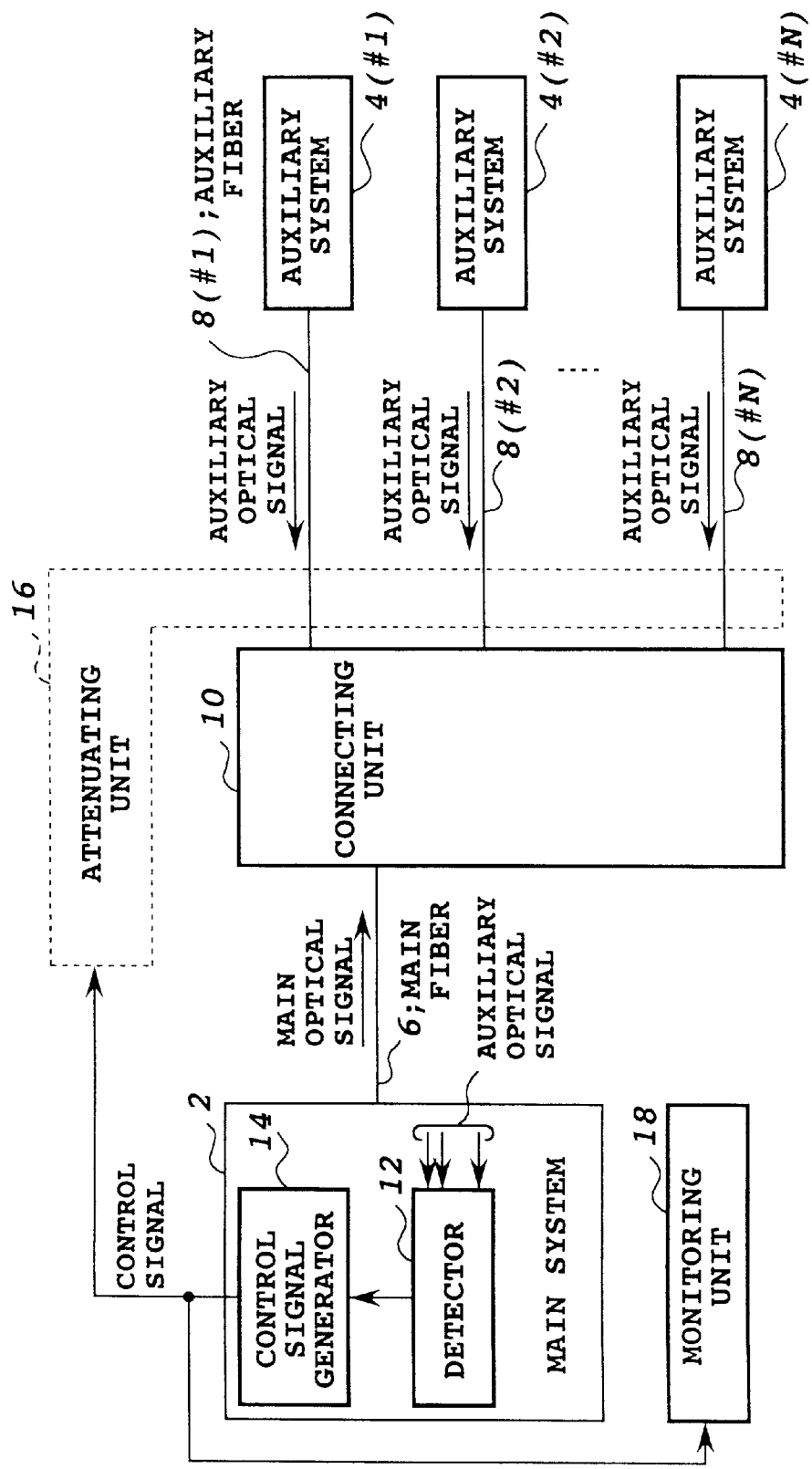
FIG. 2 is a block diagram showing a basic configuration of the optical network system according to the present invention.

Referring to FIG. 2, there is shown a basic configuration of the optical network system according to the present invention. This optical network system has a main system 2 and a plurality of auxiliary systems 4 (#1 to #N). The main system 2 outputs a main optical signal to a main fiber 6. The auxiliary systems 4 (#1 to #N) output auxiliary optical signals to auxiliary fibers 8 (#1 to #N), respectively.

The main fiber 6 and the auxiliary fibers 8 (#1 to #N) are network-connected by a connecting unit 10. The wording of "network-connected" used herein means that the main fiber 6 and each of the auxiliary fibers 8 (#1 to #N) are connected together with the bidirectionality therebetween being ensured.

The main system 2 includes a detector 12 for detecting each of the auxiliary optical signals and a control signal generator 14 for generating a control signal. The control signal includes data for designating a specific auxiliary system whose auxiliary optical signal is not detected according to the detection in the detector 12. The control signal is supplied to an attenuating unit 16. The attenuating unit 16 attenuates a main optical signal in a specific auxiliary fiber corresponding to the specific auxiliary system according to the control signal.

The wording of "attenuates a main optical signal" used herein means to reduce the power or amplitude of the main optical signal. Accordingly, the concept of attenuating the main optical signal includes the concept of cutting off the main optical signal. The main optical signal may be cut off by an optical switch as will be hereinafter described.

Assuming that there is a break point in the auxiliary fiber 8 (#1), for example, the detector 12 cannot detect the auxiliary optical signal from the auxiliary system 4 (#1). Accordingly, the auxiliary system 4 (#1) and the auxiliary fiber 8 (#1) become a specific auxiliary system and a specific auxiliary fiber, respectively, and the control signal including data for designating the auxiliary system 4 (#1) is sent to the attenuating unit 16, thereby attenuating the main optical signal in the auxiliary fiber 8 (#1). In this manner, laser hazard is prevented.

Preferably, a monitoring unit 18 for monitoring network abnormality according to the control signal is provided. In the above case, the occurrence of abnormality in the auxiliary fiber 8 (#1) or the auxiliary system 4 (#1) can be monitored by the monitoring unit 18, and the result of this monitoring can be indicated or passed to a serviceman.

Referring again to FIG. 1, there is shown a conventional optical network system to which the present invention can be effectively applied. This optical network system has a central station 100 corresponding to the main system 2 shown in FIG. 2, a plurality of subscriber's stations 200 (#1 to #N) respectively corresponding to the auxiliary systems 4 (#1 to #N) shown in FIG. 2, and a branching unit 300 for bidirectionally connecting the central station 100 and the subscriber's stations 200 (#1 to #N).

The central station 100 has an E/O unit 20 for outputting an optical signal having a wavelength $\lambda 1$ (e.g., a wavelength band of 1.55 $\mu$m), an optical amplifier 22 for amplifying the optical signal output from the E/O unit 20, an optical sender receiver (OSR) 24 for sending and receiving an optical signal having a wavelength $\lambda 2$ (e.g., a wavelength band of 1.3 $\mu$m) different from the wavelength $\lambda 1$, and a WDM (wavelength-division multiplexing) coupler 28 for coupling the optical signals having the wavelengths $\lambda 1$ and $\lambda 2$ to a main fiber 26.

The branching unit 300 includes an optical star coupler 30 corresponding to the connecting unit 10 shown in FIG. 2. The star coupler 30 has a main port 32 connected to the main fiber 26, and a plurality of auxiliary ports 34 (#1 to #N). A plurality of auxiliary fibers 36 (#1 to #N) are connected to the auxiliary ports 34 (#1 to #N), respectively.

Each of the subscriber's stations 200 (#1 to #N) has an O/E unit 38 for receiving the optical signal having the wavelength $\lambda 1$, an optical sender receiver 40 for sending and receiving the optical signal having the wavelength $\lambda 2$, and a WDM coupler 42 for connecting the O/E unit 38 and the optical sender receiver 40 to each of the auxiliary fibers 36 (#1 to #N).

For specific description of the application of the present invention to the optical network system shown in FIG. 1, it is assumed in the description below that the optical signal having the wavelength $\lambda 1$ is previously modulated by a plurality of subcarriers, that each subcarrier is previously modulated by an analog signal such as a video signal, and that the optical signal having the wavelength $\lambda 2$ is previously modulated by a burst signal for an ISDN line including a telephone line. For example, the burst signal includes digital voice data, so as to establish a telephone line with the burst signal.

In the optical network system shown in FIG. 1, a video signal can be distributed from the E/O unit 20 in the central station 100 to the O/E unit 38 in each of the subscriber's stations 200 (#1 to #N) by using the optical signal having the wavelength $\lambda 1$. Further, an ISDN line can be established between the optical sender receiver 24 in the central station 100 and the optical sender receiver 40 in each of the subscriber's stations 200 (#1 to #N) by using the optical signal having the wavelength $\lambda 2$.

In the central station 100, the optical signal having the wavelength $\lambda 1$ is amplified by the optical amplifier 22, so that the power of the optical signal having the wavelength $\lambda 1$ to be supplied to the optical star coupler 30 is high. Accordingly, if the auxiliary fiber 36 corresponding to any subscriber's station 200 located relatively close to the branching unit 300 is broken, there occurs laser hazard at the break point. To prevent this laser hazard, the present invention is applied.

Figure 3:
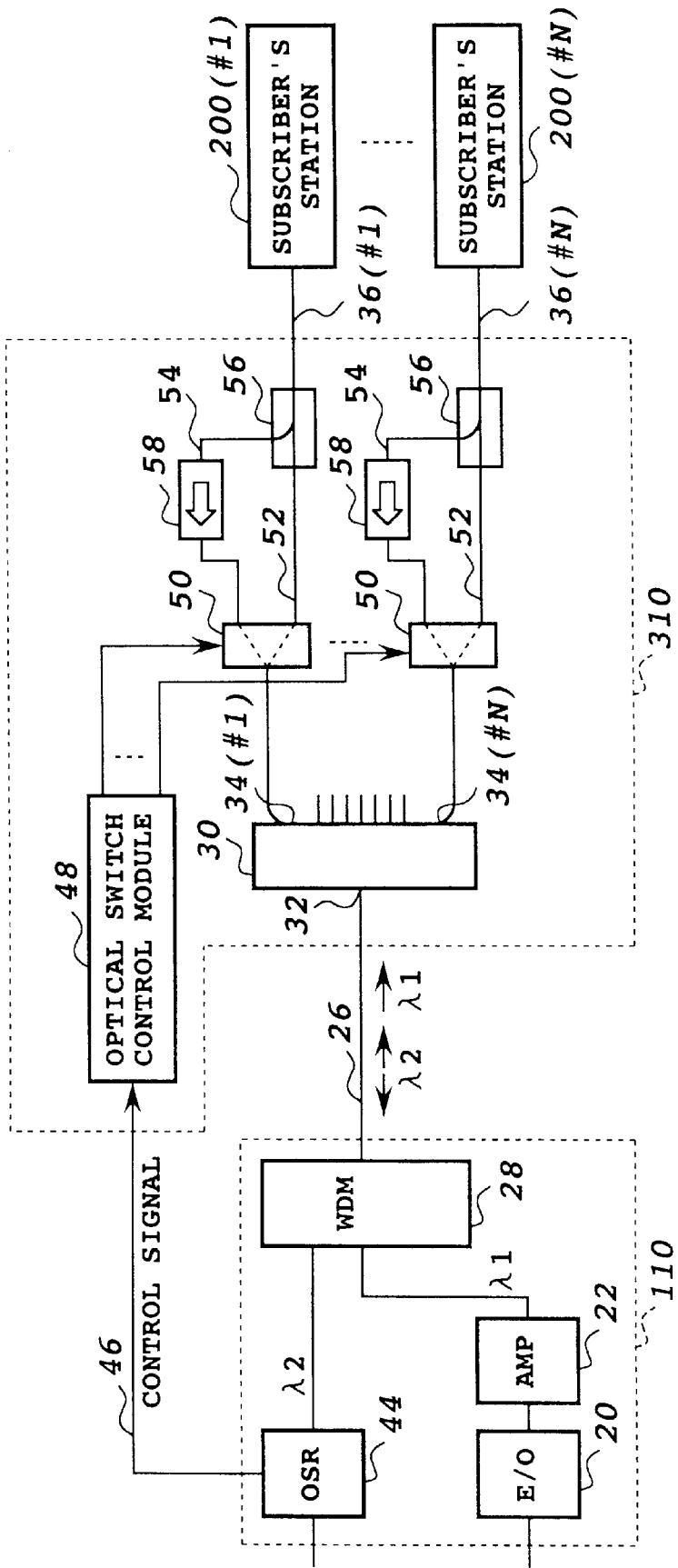
FIG. 3 is a block diagram showing a first preferred embodiment of the optical network system according to the present invention.

Referring to FIG. 3, there is shown a first preferred embodiment of the optical network system according to the present invention. In this preferred embodiment, a central station 110 has an optical sender receiver 44 for outputting a control signal. That is, the optical sender receiver 44 has not only the function of sending and receiving the optical signal having the wavelength $\lambda 2$, but also the functions of the detector 12 and the control signal generator 14 shown in FIG. 2. The control signal output from the optical sender receiver 44 is sent to a branching unit 310 by an electrical signal line 46. The control signal is input to an optical switch control module 48. The module 48 outputs switching signals to optical switches 50 respectively connected to the auxiliary ports 34 (#1 to #N) of the optical star coupler 30. The module 48 and the optical switches 50 correspond to the attenuating unit 16 shown in FIG. 2.

An optical coupler 56 is provided to branch each of the auxiliary fibers 36 (#1 to #N) into a first optical path 52 and a second optical path 54. An optical isolator 58 is provided on the way of the second optical path 54. Each optical switch 50 selectively switches the connection of the first optical path 52 or the second optical path 54 to each of the auxiliary ports 34 (#1 to #N) of the optical star coupler 30.

When the first optical path 52 is selected by each optical switch 50, the optical signals having the wavelengths $\lambda 1$ and $\lambda 2$ are transmitted from the optical star coupler 30 to each of the subscriber's stations 200 (#1 to #N), and the optical signal having the wavelength $\lambda 2$ is transmitted from each of the subscriber's stations 200 (#1 to #N) to the central station 110, thus ensuring the bidirectionality. On the other hand, when the second optical path 54 is selected by each optical switch 50, the optical signal having the wavelength λ2 from each of the subscriber's stations 200 (#1 to #N) is transmitted through the optical isolator 58 to the central station 110, but the optical signals having the wavelengths λ1 and λ2 from the central station 110 are cut off by the optical isolator 58 and are not transmitted to each of the subscriber's stations 200 (#1 to #N).

Figure 4:
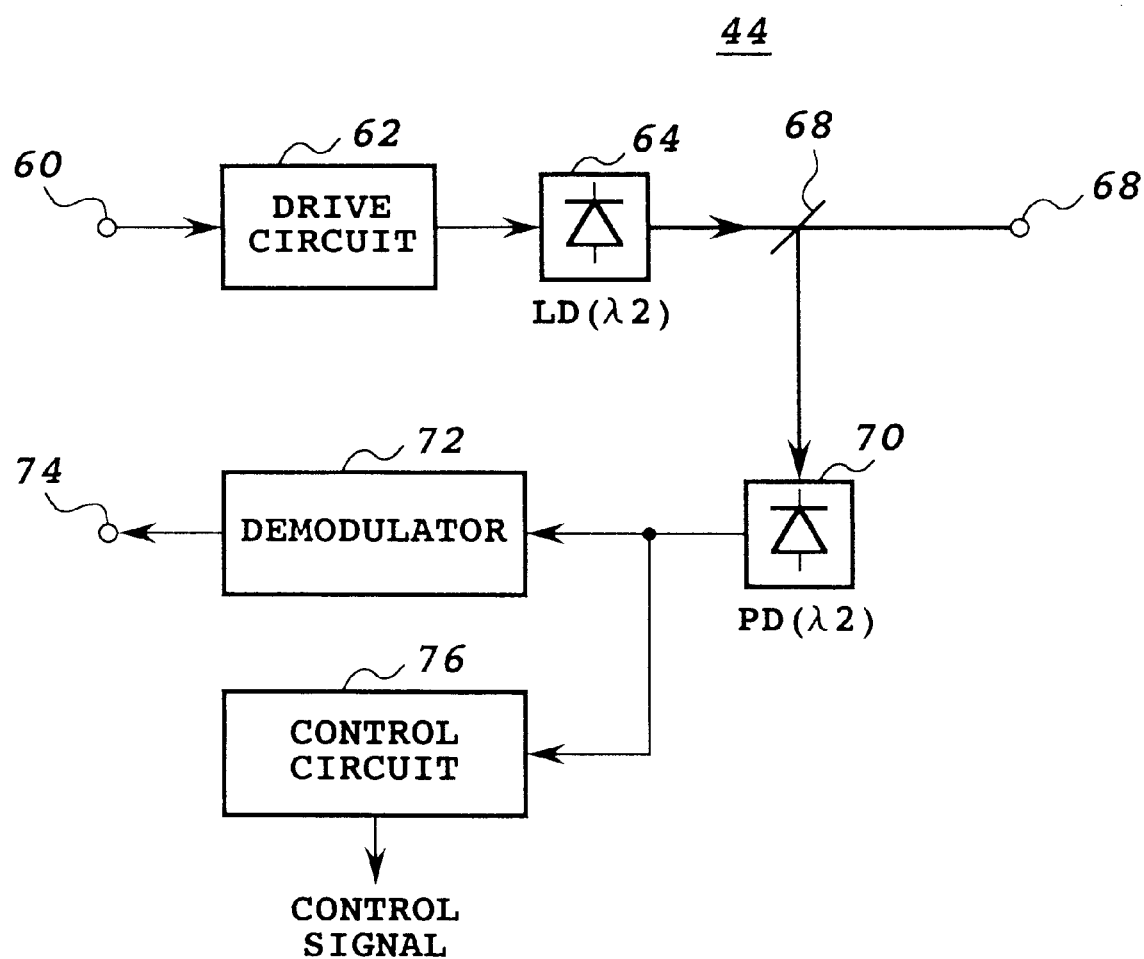
FIG. 4 is a block diagram of an optical sender receiver in a central station.

Referring to FIG. 4, there is shown a specific configuration of the optical sender receiver 44 applicable to the central station 110 shown in FIG. 3. Digital data including voice data is supplied as a burst signal from an input port 60 to a drive circuit 62. The drive circuit 62 modulates a bias current to a laser diode 64 according to the burst signal supplied, and as a result the laser diode 64 outputs the optical signal having the wavelength λ2. The optical signal from the laser diode 64 is passed through an optical coupler 66 and next output from a port 68. The port 68 is connected to the WDM coupler 28 (see FIG. 3).

The optical signal having the wavelength λ2 from each of the subscriber's stations 200 (#1 to #N) is supplied from the port 68 through the optical coupler 66 to a photodetector 70 such as a photodiode. The optical signal from each of the subscriber's stations 200 (#1 to #N) is also modulated by a burst signal of digital data including voice data. An electrical signal output from the photodetector 70 is supplied to a demodulator 72, and a demodulated signal is output from the demodulator 72 is output from a port 74. The electrical signal from the photodetector 70 is also supplied to a control circuit 76. The control circuit 76 corresponds to the control signal generator 14 shown in FIG. 2, and generates a control signal including data for designating any of the subscriber's stations whose optical signal having the wavelength λ2 cannot be detected. For example, if any of the auxiliary fibers 36 (#1 to #N) shown in FIG. 3 is broken, the optical signal from the subscriber's station connected to the broken auxiliary fiber 36 cannot be detected by the photodetector 70 shown in FIG. 4, so that this subscriber's station becomes a specific subscriber's station.

A configuration obtained by removing the control circuit 76 from the optical sender receiver 44 shown in FIG. 4 may be used as the optical sender receiver 40 (see FIG. 1) in each of the subscriber's stations 200 (#1 to #N).

Figure 5:
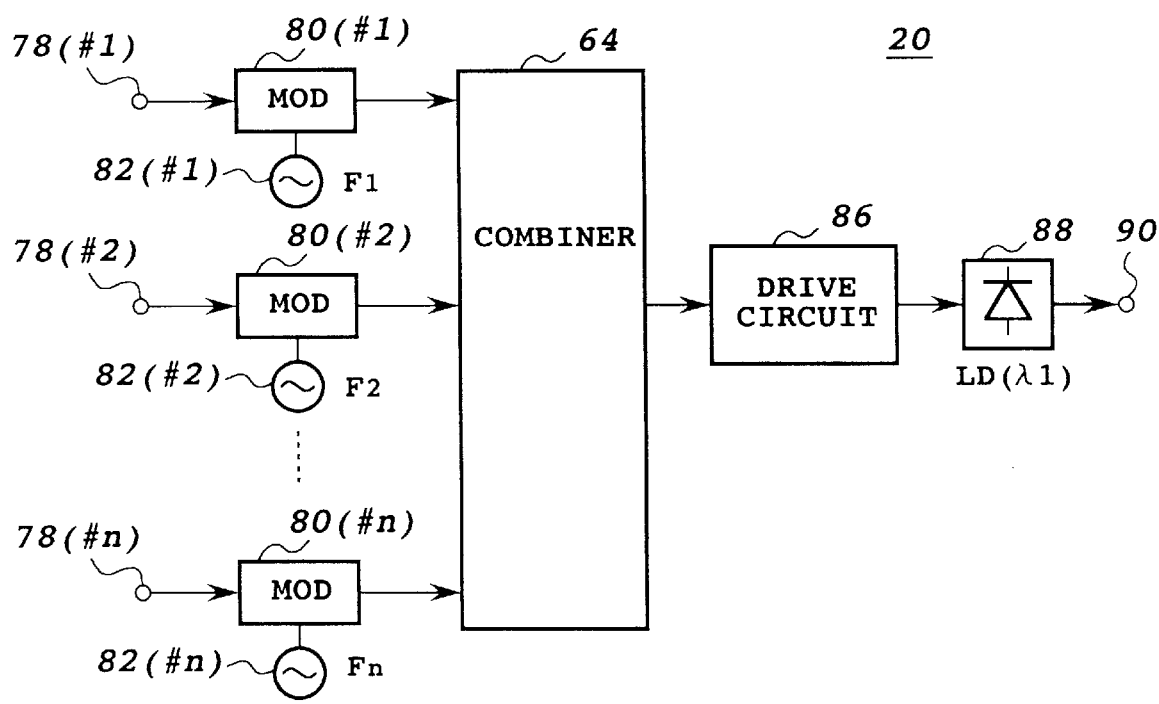
FIG. 5 is a block diagram of an E/O unit in the central station.

Referring to FIG. 5, there is shown a specific configuration of the E/O unit 20 applicable to the central station 110 shown in FIG. 3. Analog signals to be transmitted are supplied to n-channels of ports 78 (#1 to #n), respectively. In this case, each analog signal to be transmitted includes a video signal. To carry out subcarrier modulation, modulating circuits 80 (#1 to #n) and oscillators 82 (#1 to #n) respectively connected thereto are used. The oscillators 82 (#1 to #n) output subcarriers having frequencies F1 to Fn, respectively. The modulating circuits 80 (#1 to #n) modulate the subcarriers by the video signals supplied, and output signals from the modulating circuits 80 (#1 to #n) are combined by a combiner 84. A drive circuit 86 modulates a bias current to a laser diode 88 according to an output signal from the combiner 84, and as a result the laser diode 88 outputs the optical signal having the wavelength λ1. This optical signal is supplied from a port 90 to the optical amplifier 22 (see FIG. 3).

The optical amplifier 22 is composed of an optical amplifying medium and means for pumping the optical amplifying medium so that the optical amplifying medium has a gain band including the wavelength of the optical signal supplied. In the case that the optical amplifying medium is a doped fiber doped with a rare earth element, the pumping means includes a pump light source for outputting pump light having a predetermined wavelength, and an optical circuit for supplying the pump light into the doped fiber from at least one of a first end and a second end of the doped fiber. For example, it is possible to provide a gain band including a wavelength of 1.55 μm by setting the wavelength of the pump light to a band of 0.98 μm or 1.48 μm with an erbium doped fiber (EDF). A semiconductor chip may also be used as the optical amplifying medium. In this case, the pumping means includes a circuit for injecting a current into the semiconductor chip.

Figure 6:
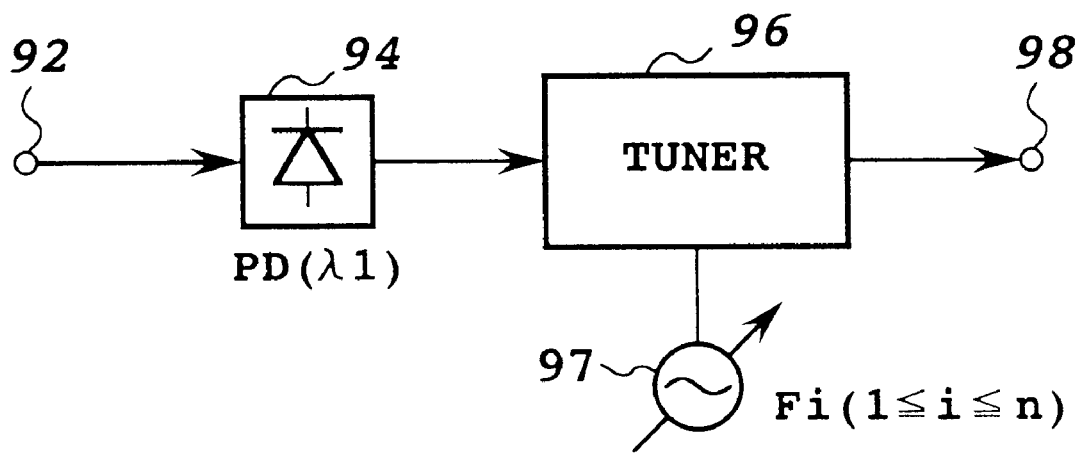
FIG. 6 is a block diagram of an O/E unit in a subscriber's station.

Referring to FIG. 6, there is shown a specific configuration of the O/E unit 38 (see FIG. 1) applicable to each of the subscriber's stations 200 (#1 to #N) shown in FIG. 3. The optical signal having the wavelength λ1 from each of the auxiliary fibers 36 (#1 to #N) (see FIG. 3) is supplied to an input port 92 connected to the WDM coupler 42 (see FIG. 1). This optical signal is converted into an electrical signal by a photodetector 94 such as a photodiode. This electrical signal is next supplied to a tuner 96. A tuning oscillator 97 oscillating at a variable frequency is connected to the tuner 96. When the oscillation frequency of the oscillator 97 is set to Fi (i is an integer satisfying 1≦i≦n), the tuner 96 is tuned to the oscillator 82 (#i) of the E/O unit 20 shown in FIG. 5. As a result, the video signal supplied to the port 78 (#i) is selectively demodulated and a demodulated signal is output from the port 98.

Figure 7A:
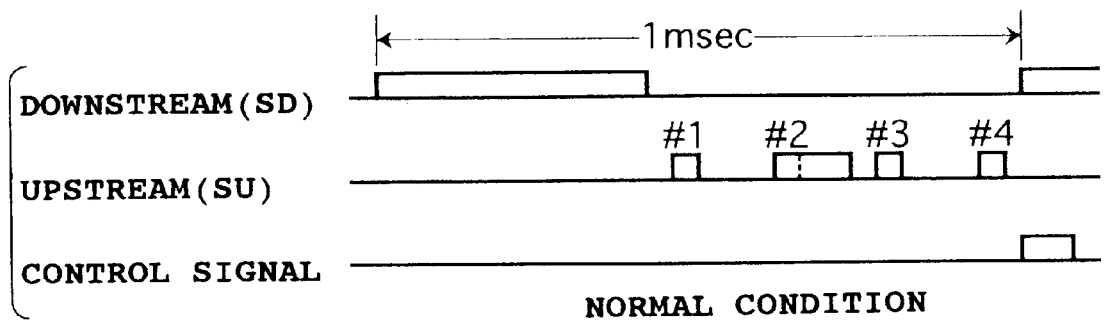
FIGS. 7A to 7C are timing charts in the system shown in FIG. 3.
Figure 7B:
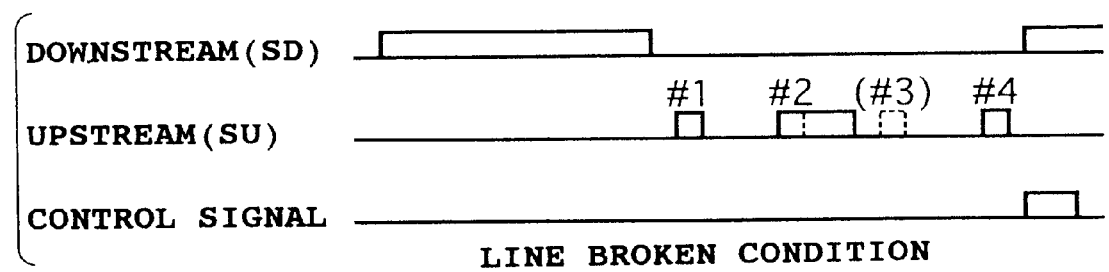
Figure 7C:
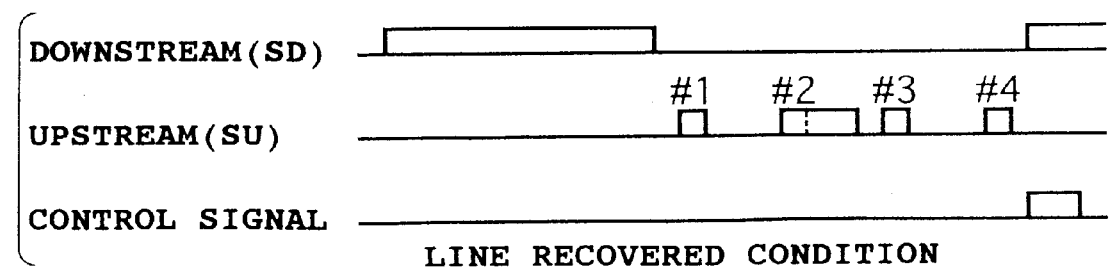

Referring to FIGS. 7A to 7C, there are shown timing charts for illustrating the operation of the system shown in FIG. 3. It is assumed that the number of the subscriber's stations 200 (#1 to #N) is 4, i.e., N=4, and that there occurs a line trouble in the third subscriber's station 200 (#3). The line trouble is a break of the auxiliary fiber 36 (#3) in this case.

Referring to FIG. 7A, there is shown a timing chart in the case that there is no line trouble in each of the subscriber's stations 200 (#1 to #4). A downstream signal (SD) to be sent from the optical sender receiver 44 in the central station 110 to each of the subscriber's stations 200 (#1 to #4) is a burst signal as mentioned above, and the period of the burst signal is 1 msec, for example. Symbols #1 to #4 denote upstream signals (SU) to be sent from the optical sender receivers 40 (see FIG. 1) in the subscriber's stations 200 (#1 to #4) to the central station 110. These upstream signals #1 to #4 are also burst signals. Particularly at the timing shown, the upstream signals (SU) output from the subscriber's stations (#1, #3, and #4) have headers respectively specifying their station identities, but do not have substantial payload data. Only the upstream signal (SU) output from the subscriber's station 200 (#2) has a header and payload data. The optical sender receiver 44 in the central station 110 receives the upstream signals (SU) #1 to #4, and sends a control signal to the optical switch control module 48 at the timing just after receiving the last upstream signal (SU) #4. Specific contents of the control signal will be hereinafter described. In the normal case shown in FIG. 7A, each optical switch 50 selects the first optical path 52, thereby establishing the bidirectionality between the central station 110 and each of the subscriber's stations 200 (#1 to #4).

Referring to FIG. 7B, there is shown a timing chart in the case that the auxiliary fiber 36 (#3) is broken. In this case, the optical sender receiver 44 in the central station 110 cannot receive the upstream signal (SU) from the subscriber's station 200 (#3). As a result, the subscriber's station 200 (#3) becomes a specific subscriber's station (specific auxiliary system) in this case, and a control signal including data for designating the subscriber's station 200 (#3) is sent from the optical sender receiver 44 to the optical switch control module 48. As a result, the level of a switching signal output from the optical switch control module 48 changes, and the optical switch 50 corresponding to the subscriber's station 200 (#3) switches the first optical path 52 to the second optical path 54. As a result, the upstream signal (SU) from the subscriber's station 200 (#3) is passed through the optical isolator 58, but the downstream signal (SD) and the optical signal having the wavelength λ1 relating to video from the central station 110 are cut off by the optical isolator 58. Thus, laser hazard on the auxiliary fiber 36 (#3) can be prevented.

Referring to FIG. 7C, there is shown a timing chart in the case that the auxiliary fiber 36 (#3) has been recovered from the break. Since the optical isolator 58 is adopted in this preferred embodiment, both the prevention of laser hazard and the detection of the upstream signal are allowed. That is, when the auxiliary fiber 36 (#3) is restored, the upstream signal (SU) from the subscriber's station 200 (#3) is passed through the optical isolator 58 and detected by the optical sender receiver 44 in the central station 110. When a control signal reflecting the detection result is sent from the optical sender receiver 44 to the optical switch control module 48, the level of a switching signal output from the optical switch control module 48 changes, and the optical switch 50 corresponding to the auxiliary fiber 36 (#3) switches the second optical path 54 to the first optical path 52. As a result, the bidirectionality between the subscriber's station 200 (#3) and the central station 110 is restored.

Figure 8:
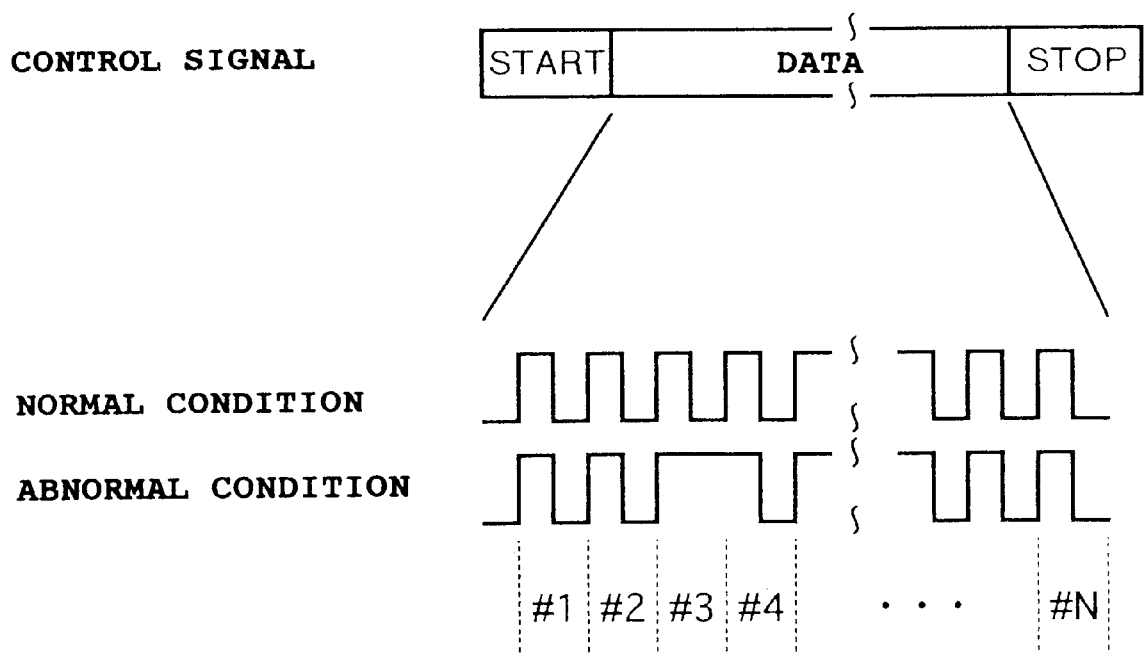
FIG. 8 is an illustration of a control signal.

Referring to FIG. 8, there is shown a frame configuration of a control signal to be supplied from the optical sender receiver 44 in the central station 110 to the optical switch control module 48. The control signal has a data region including data for designating a specific subscriber's station between a start flag and a stop flag. The data on a subscriber's station whose upstream signal (SU) can be detected is "10", whereas the data on a specific subscriber's station whose upstream signal (SU) cannot be detected is "11".

For example, in the case that the upstream signals (SU) from all of the subscriber's stations 200 (#1 to #4) are detected as shown in FIG. 7A, the data is "10101010". In the case that the subscriber's station 200 (#3) becomes a specific subscriber's station as shown in FIG. 7B, the data is "10101110".

Figure 9:
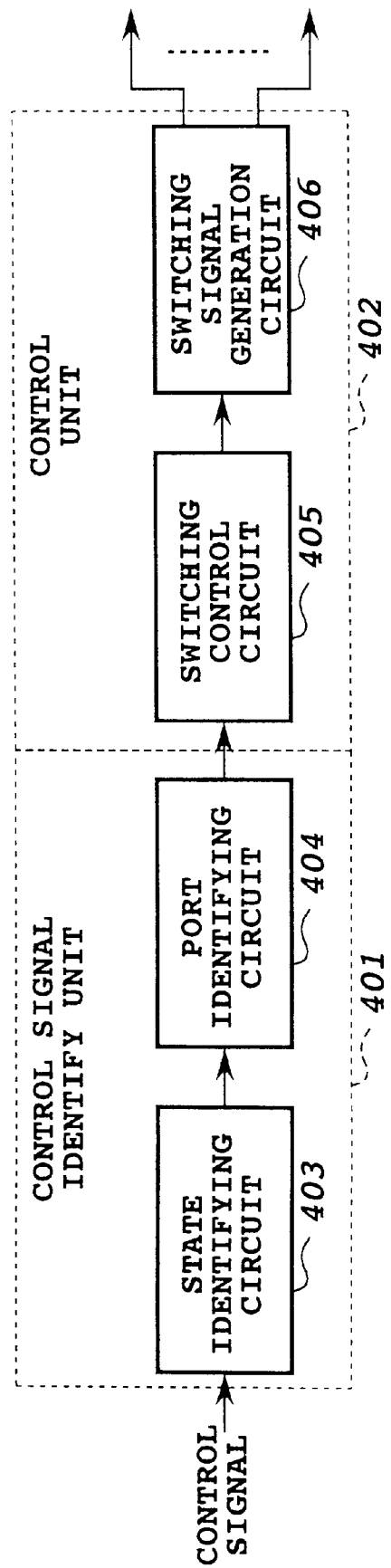
FIG. 9 is a block diagram of an optical switch control module.

Referring to FIG. 9, there is shown a specific configuration of the optical switch control module 48. The module 48 includes a control signal identifying unit 401 and a control unit 402. The control signal identifying unit 401 has a state identifying circuit 403 for determining whether or not there is a specific subscriber's station whose upstream signal (SU) cannot be detected, according to a control signal, and a port identifying circuit 404 for designating the specific subscriber's station if it is present. The control unit 402 has a switching control circuit 405 for switching the optical switch 50 (see FIG. 3) corresponding to the specific subscriber's station, and a switching signal generating circuit 406 for supplying a switching signal for the switching to each optical switch 50.

Figure 10:
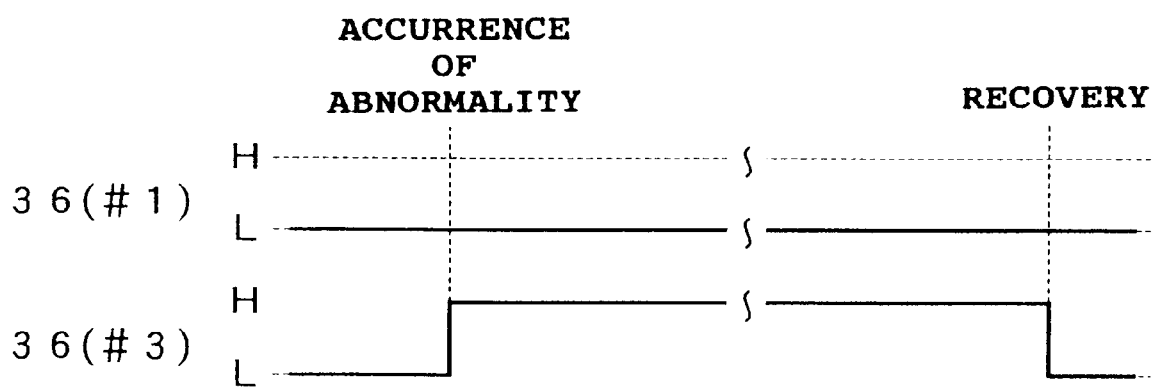
FIG. 10 is a timing chart of a switching signal.

Referring to FIG. 10, there is shown a timing chart of the switching signal to be supplied to each optical switch 50. An input signal to the optical switch 50 corresponding to the auxiliary fiber 36 (#1), for example, which has no abnormality is always a low level (L), and as a result the first optical path 52 is selected. On the other hand, an input signal to the optical switch 50 corresponding to the auxiliary fiber 36 (#3) is a low level before abnormality occurs, and the first optical path 52 is selected during this time period. However, when abnormality occurs, the optical sender receiver 44 in the central station 110 becomes a state that it cannot detect the upstream signal (SU) from the subscriber's station 200 (#3), so that the input signal to the optical switch 50 becomes a high level (H), and is switched to the second optical path 54. When the trouble in the auxiliary fiber 36 (#3) is thereafter removed, the optical sender receiver 44 in the central station 110 restores a state that it can detect the upstream signal (SU) from the subscriber's station 200 (#3). As a result, the input signal to the optical switch 50 becomes a low level again, and the first optical path 52 is selected again.

Figure 11:
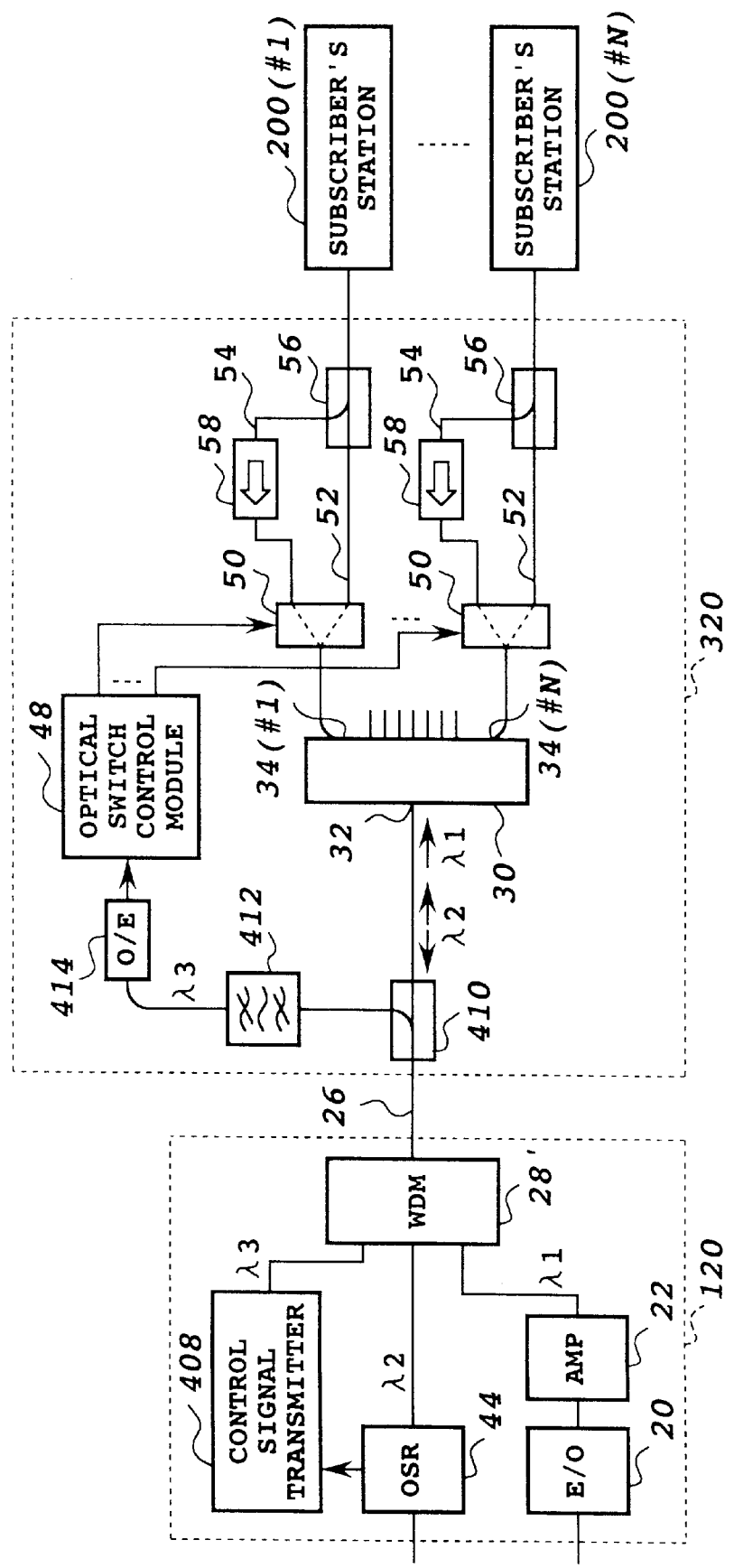
FIG. 11 is a block diagram showing a second preferred embodiment of the optical network system according to the present invention.

Referring to FIG. 11, there is shown a second preferred embodiment of the optical network system according to the present invention. In the first preferred embodiment shown in FIG. 3, the control signal is electrically transmitted by the signal line 46. In contrast therewith, the control signal is transmitted by an optical signal having a wavelength λ3 in the second preferred embodiment. The configuration of the second preferred embodiment will now be described more specifically.

A central station 120 has a control signal transmitter 408 in addition to the E/O unit 20, the optical amplifier 22, and the optical sender receiver 44. The transmitter 408 outputs an optical signal having a wavelength λ3 obtained by electro-optical conversion (E/O conversion) of a control signal supplied from the optical sender receiver 44. The optical signals having the wavelengths λ1, λ2, and λ3 are combined by a WDM coupler 28' and next output to the main fiber 26.

A branching unit 320 has an optical coupler 410 connected to the main fiber 26 and an optical band-pass filter 412 connected to the optical coupler 410, so as to extract the optical signal having the wavelength λ3 transmitted by the main fiber 26. The optical band-pass filter 412 has a pass band including the wavelength λ3, so that the optical signal having the wavelength λ3 extracted by the filter 412 is converted into an electrical signal by an O/E converter 414. This electrical signal is the same as the control signal. This control signal is supplied to the optical switch control module 48. The operation of the optical switch control module 48 according to the control signal in this preferred embodiment is similar to that in the first preferred embodiment shown in FIG. 3, so the description thereof will be omitted herein.

According to the second preferred embodiment shown in FIG. 11, the control signal is sent from the central station 120 to the branching unit 320 by the optical signal having the wavelength λ3. Accordingly, the electrical signal line 46 as shown in FIG. 3 is unnecessary.

In this preferred embodiment, the wavelength λ3 is included in a band of 1.3 μm, but it is set to a wavelength different from the wavelength λ2.

Figure 12:
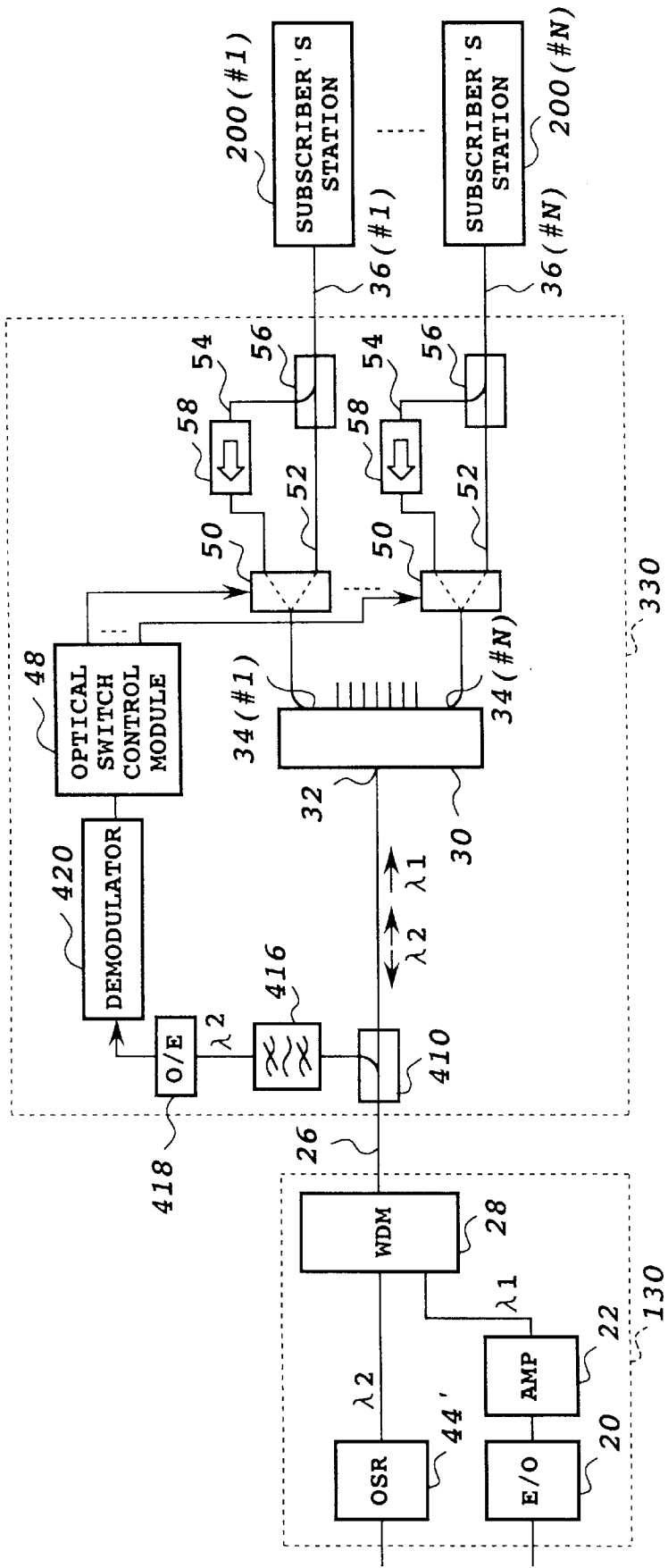
FIG. 12 is a block diagram showing a third preferred embodiment of the optical network system according to the present invention.

Referring to FIG. 12, there is shown a third preferred embodiment of the optical network system according to the present invention. In this preferred embodiment, the control signal is transmitted by the optical signal having the wavelength λ2 output from an optical sender receiver 44' in a central station 130. That is, on the basis of the fact that the optical signal having the wavelength λ2 is modulated by a burst signal, the control signal is added as a part of the burst signal.

Figure 13A:
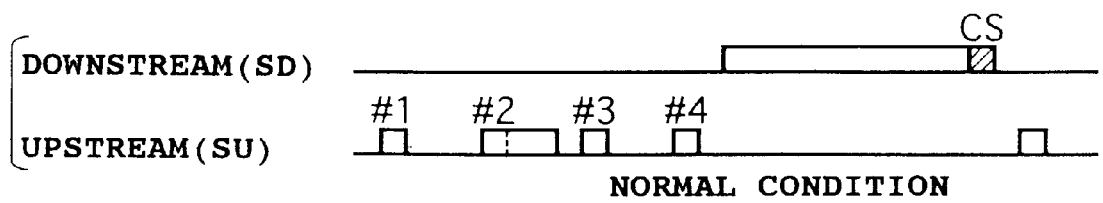
FIGS. 13A to 13C are timing charts in the system shown in FIG. 12.
Figure 13B:
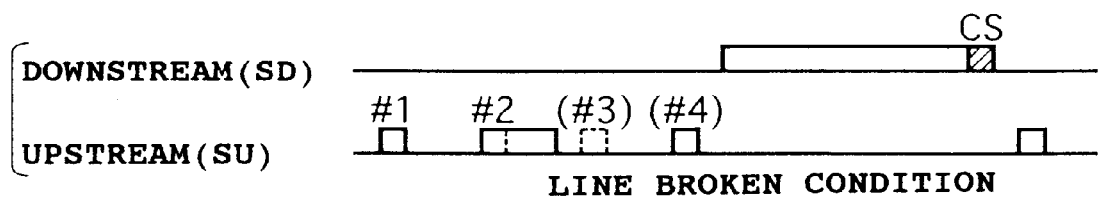
Figure 13C:
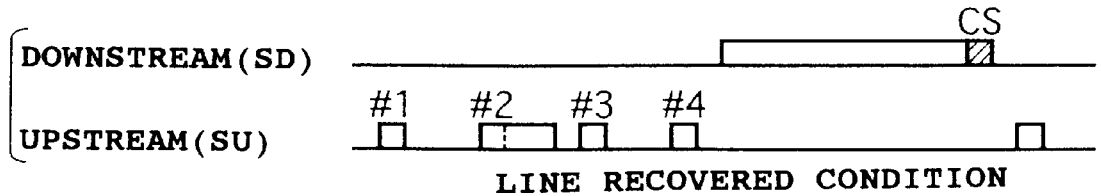

Referring to FIGS. 13A, 13B, and 13C, there are shown timing charts in the system shown in FIG. 12. FIGS. 13A, 13B, and 13C correspond to FIGS. 7A, 7B, and 7C, respectively. Since the downstream signal (SD) output from the central station 130 is a burst signal, a control signal portion CS is provided at a front edge or a rear edge of the burst signal.

Referring again to FIG. 12, a branching unit 330 has an optical band-pass filter 416 having a pass band including the wavelength λ2, so as to extract the optical signal having the wavelength μ2 transmitted by the main fiber 26. The optical signal having the wavelength λ2 extracted by the filter 416 is converted into an electrical signal by an O/E converter 418. This electrical signal remains the burst signal. Accordingly, a demodulator 420 is used to regenerate the control signal. The control signal regenerated is next supplied to the optical switch control module 48. The operation of the optical switch control module 48 in this preferred embodiment is similar to that in the first preferred embodiment, so the description thereof will be omitted herein.

According to this preferred embodiment, the control signal is transmitted by the burst signal in the optical sender receiver 44'. Accordingly, the signal line 46 shown in FIG. 3 and the control signal transmitter 408 shown in FIG. 11 are unnecessary.

Figure 14:
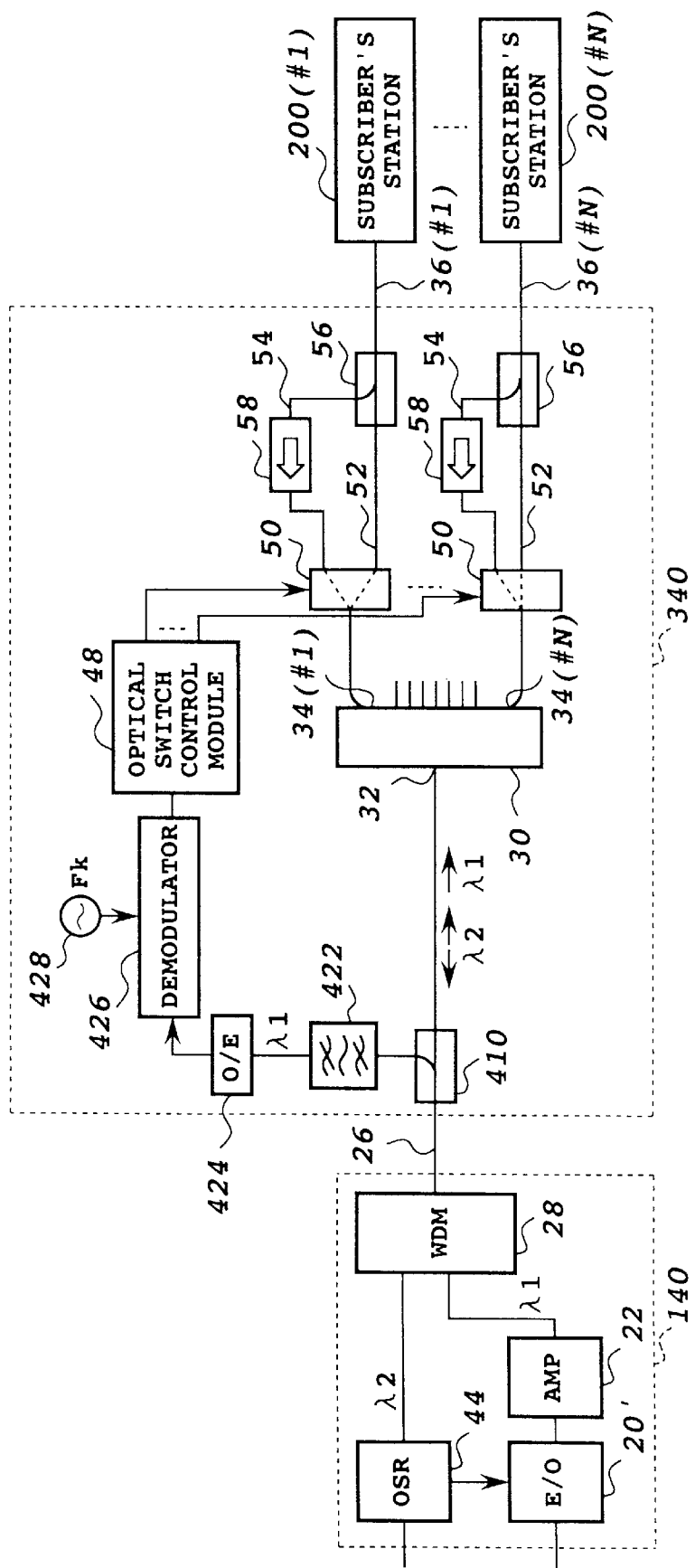
FIG. 14 is a block diagram showing a fourth preferred embodiment of the optical network system according to the present invention.

Referring to FIG. 14, there is shown a fourth preferred embodiment of the optical network system according to the present invention. In this preferred embodiment, on the basis of the fact that the optical signal having the wavelength λ1 output from an E/O unit 20' in a central station 140 is modulated by a plurality of subcarriers, the control signal is transmitted by any one of the subcarriers.

The E/O unit 20' has the same hardware as that shown in FIG. 5. The control signal from the optical sender receiver 44 shown in FIG. 14 is supplied to one port 78 (#k) of the ports 78 (#1 to #n) shown in FIG. 5. The symbol k is an integer satisfying $1 \leq k \leq n$. Accordingly, the subcarrier having the frequency $F_k$ from the oscillator 82 (#k) is modulated by the control signal in the modulating circuit 80 (#k).

Referring again to FIG. 14, a branching unit 340 has an optical band-pass filter 422 having a pass band including the wavelength λ1, so as to extract the optical signal having the wavelength λ1 from the main fiber 26. The optical signal having the wavelength λ1 passed through the filter 422 is converted into an electrical signal by an O/E circuit 424. This electrical signal is supplied to a demodulator 426, and is subjected to synchronous detection by using an oscillator 428 oscillating at the frequency $F_k$, thereby regenerating the control signal. The control signal regenerated is next supplied to the optical switch control module 48. The operation of the optical switch control module 48 in this preferred embodiment is similar to that in the first preferred embodiment, so the description thereof will be omitted herein.

According to this preferred embodiment, the control signal is transmitted by the optical signal having the wavelength λ1. Accordingly, the signal line 46 shown in FIG. 3 and the control signal transmitter 408 shown in FIG. 11 are unnecessary.

While the attenuating unit 16 shown in FIG. 2 includes the optical switches 50 (see FIG. 3, for example) in all the preferred embodiments mentioned above, the present invention is not limited to this configuration. For example, FIG. 15 shows a modification of the attenuating unit 16 shown in FIG. 2. In this modification, an optical coupler 430 is used in place of each optical switch 50, and an optical attenuator (ATT) 432 having a variable attenuation is provided on the way of the first optical path 52. The attenuation of the optical attenuator 432 is adjusted by the control signal. That is, the attenuation of the optical attenuator 432 corresponding to a specific auxiliary system is increased according to the control signal, thereby preventing laser hazard. Thus, the scope of the invention is defined by the appended claims and all changes and modifications as fall within the equivalence of the scope of the claims are therefore to be embraced by the invention.

What is claimed is:

1. An optical network system comprising:

a main system for outputting a main optical signal to a main fiber;

a plurality of auxiliary systems respectively connected to a plurality of auxiliary fibers, for outputting auxiliary optical signals to said auxiliary fibers, respectively; and a connecting unit for connecting said main fiber and said auxiliary fibers;

said main system having a detector for detecting said auxiliary optical signals from said auxiliary systems, and a generator for generating a control signal for designating a specific one of said auxiliary systems whose auxiliary optical signal is not detected, according to detection by said detector;

said optical network system further comprising an attenuator for attenuating said main optical signal in said auxiliary fiber corresponding to said specific auxiliary system according to said control signal.

2. A system according to claim 1, wherein said connecting unit comprises an optical star coupler.

3. A system according to claim 1, wherein said main system comprises a central station, and each of said auxiliary systems comprises a subscriber's station.

4. A system according to claim 1, wherein said control signal is transmitted by an electrical signal.

5. A system according to claim 1, wherein said control signal is transmitted by an optical signal having a wavelength different from a wavelength of said main optical signal;

said optical signal propagating in said main fiber;

said system further comprising means for extracting said optical signal from said main fiber, and means for converting said optical signal extracted into an electrical signal.

6. A system according to claim 1, wherein said main optical signal comprises a first optical signal having a first wavelength and a second optical signal having a second wavelength;

each of said auxiliary optical signals comprising a third optical signal having said second wavelength;

each of said auxiliary systems including means for receiving said first optical signal, and means for receiving and sending said second and third optical signals, respectively;

said main system including means for sending said first optical signal, and means for sending and receiving said second and third optical signals, respectively.

7. A system according to claim 6, wherein said second optical signal is modulated by a burst signal.

8. A system according to claim 7, wherein said control signal is transmitted by said burst signal;

said system further comprising means for extracting said second optical signal from said main fiber, and means for converting said second optical signal extracted into an electrical signal.

9. A system according to claim 7, wherein said burst signal includes voice data.

10. A system according to claim 6, wherein said first optical signal is modulated by a plurality of subcarriers.

11. A system according to claim 10, wherein said control signal is transmitted by one of said subcarriers;

said system further comprising means for extracting said first optical signal from said main fiber, and means for converting said first optical signal extracted into an electrical signal.

12. A system according to claim 10, wherein each of said subcarriers is modulated by an analog signal.

13. A system according to claim 12, wherein said analog signal includes a video signal.

14. A system according to claim 6, wherein said main system further comprises an optical amplifier for amplifying said first optical signal.

15. A system according to claim 14, wherein said first wavelength is included in a band of 1.55 $\mu$m;

said optical amplifier comprising an erbium doped fiber amplifier.

16. A system according to claim 1, wherein said attenuator includes an optical switch connected to each of said auxiliary fibers;

each of said auxiliary fibers including first and second optical paths;

said optical switch selectively switching said first and second optical paths according to said control signal;

said system further comprising an optical isolator provided on any one of said first and second optical paths.

17. A system according to claim 1, wherein each of said auxiliary fibers includes first and second optical paths;

said attenuator including an optical attenuator provided on said first optical path and having a variable attenuation;

said system further comprising an optical isolator provided on said second optical path;

said attenuation of said optical attenuator being varied according to said control signal.

18. A system according to claim 1, further comprising means for monitoring network abnormality according to said control signal.

* * * * *